Jan. 17, 1956          H. H. CROSS          2,731,276
SUPPLEMENTAL WHEEL ASSEMBLY FOR VEHICLES
Filed Sept. 29, 1950          2 Sheets-Sheet 1
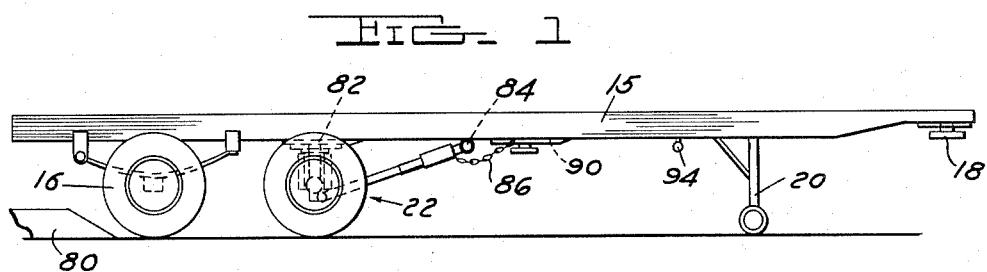
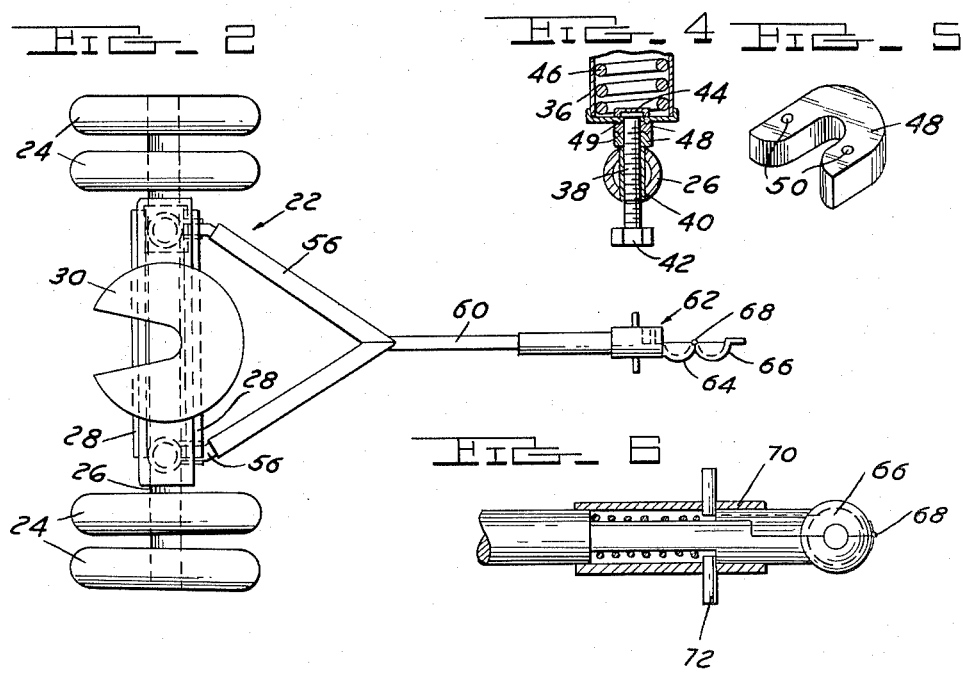
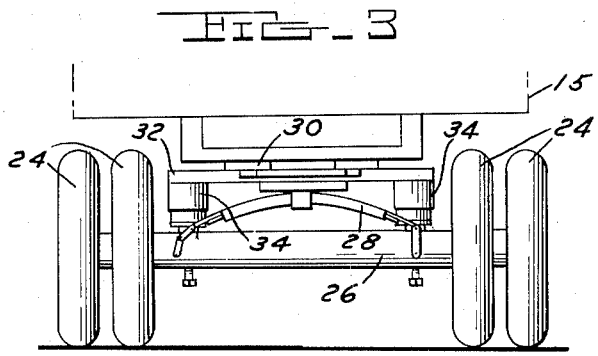
INVENTOR.
HAROLD H. CROSS
BY
*Barnes, Kisselle, Laughlin & Raisch*
ATTORNEYS Jan. 17, 1956    H. H. CROSS    2,731,276
SUPPLEMENTAL WHEEL ASSEMBLY FOR VEHICLES
Filed Sept. 29, 1950    2 Sheets-Sheet 2
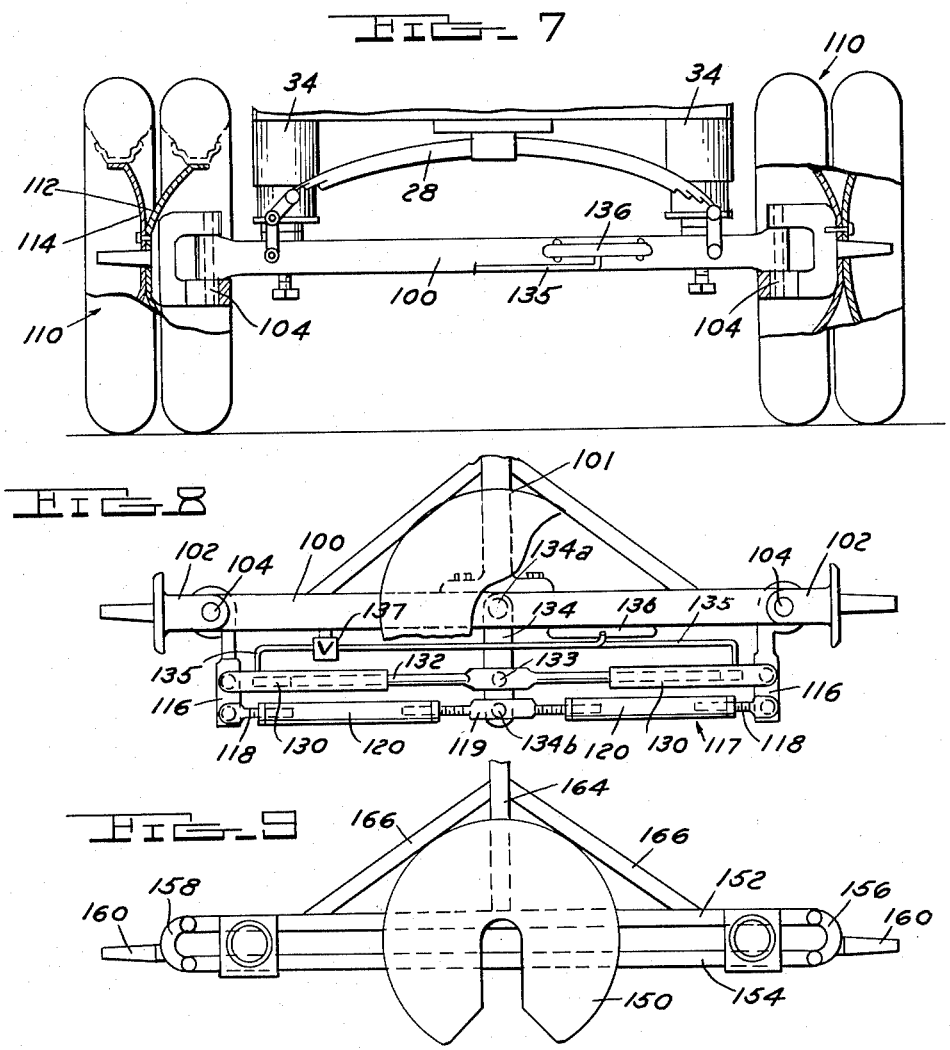
INVENTOR.
HAROLD H. CROSS
BY
Barnes, Kisselle, Laughlin & Raisch
ATTORNEYS

United States Patent Office 2,731,276
Patented Jan. 17, 1956

2,731,276

SUPPLEMENTAL WHEEL ASSEMBLY FOR VEHICLES

Harold H. Cross, Flint, Mich.

Application September 29, 1950, Serial No. 187,504

2 Claims. (Cl. 280—81)

This invention relates to a tractor-trailer-truck combination and has particularly to do with the provision of a supplemental wheel assembly to be associated with a truck trailer to change the proportional axle load.

The state regulations on truck traffic vary, some being based on total axle load and some being based on the total load of a particular truck or trailer. In some long-distance trips, it is necessary to go through states having these varying regulations; and an object of the present invention is to provide a system and apparatus for maximum loading of a trailer while meeting the various regulations of the states.

Briefly, this is accomplished by providing a supplemental wheel assembly with an axle which may be easily attached to a trailer at one of several points to change the axle load and which may be readily removed when desired where regulations are based on total load.

Drawings accompany the description, and the various views thereof may be briefly described as:

Figure 1, a view of a trailer showing the supplemental wheel assembly in position.

Figure 2, a plan view of the wheel assembly.

Figure 3, an elevation of the wheel assembly showing the relationship to a trailer body.

Figure 4, a detailed portion of the axle showing a means for varying the spring load.

Figure 5, a perspective view of a spring load insert.

Figure 6, a view of a wheel assembly tongue attachment.

Figure 7, an assembly view of a double wheel axle assembly having dirigible wheels.

Figure 8, a plan view of the steering mechanism.

Figure 9, a modified steering mechanism.

Referring to the drawings, a platform of a semi-trailer is shown at 15 having a standard rear wheel assembly 16, a fifth wheel attachment 18, and a front end dolly 20. A supplemental wheel assembly is shown at 22 and, as best shown in Figures 2 and 3, consists of wheels and tires 24 mounted on an axle 26. A double leaf spring assembly 28 is mounted fore and aft of the axle to support the load which will be received on a fifth wheel disc 30 supported by cross arm 32 which in turn is connected to the axle 26 by a telescoping sleeve system 34 containing a coil spring. The details of this coil spring assembly with respect to the axle are shown in Figure 4.

The lower telescoping section 36 is associated with the axle by a threaded bar 38 which passes through a threaded sleeve 40 rigidly held in the axle. A hexagonal head 42 on the bar 38 permits the raising of the sleeve 36 since the other end of the bar 38 is headed at 44 and will turn in the section 36.

The bar may be raised to increase the spring tension of coil spring 46, after which horseshoe-shaped inserts 48, as shown in Figure 5, may be threaded around the bar and the load on the threads may then be backed off to allow the load of the telescoping spring section to be carried by the inserts. The inserts are provided with pins 49, Figure 4, which are received in holes 50 to prevent accidental removal. Pins 49 also extend from the bottom of telescoping section 36 to engage the insert 48.

Extending forward from the axle are yoke members 56 which converge to a single tongue 60 having a fastening connection 62 at the forward end thereof. This connection is intended to co-operate with a ball stud on the bottom of the trailer platform and consists of a split ball section 64, one portion 66 of which hinges at 68 and is held normally in place by a spring-pressed sleeve 70 which may be drawn back by transverse bars 72.

In the operation of the device thus far described, it will be seen that if the trailer or semi-trailer is to be passed through a state which has a maximum axle load a supplemental wheel assembly may be assembled to the trailer, preferably by backing the standard wheel 16 onto a platform 80 as shown in Figure 1 wherein the other wheel assembly may be rolled into place and engaged with the fifth wheel connection 82 on the trailer. Then the tongue of the trailer may be assembled to a ball stud 84 and suitable chains 86, as required, may be attached for safety purposes.

After the assembly, the semi-trailer can be pulled forward off the ramp 80 and the load adjustment may be made by turning the threaded bar 38 and placing in the proper number of inserts to equalize the load on the two wheel assemblies. Thus loaded, the trailer may be passed through the states with the maximum axle load requirements; and as it enters the state with a total maximum load requirement regardless of axle load the additional rear assembly may be removed and stored at a convenient place until the truck returns.

As shown in Figure 1, a supplemental fifth wheel connection 90 is shown forward of the connection 82 with a suitable ball stud 94 also properly positioned so that the wheel assembly, if desired, may be placed forward on the semi-trailer, depending on the nature of the load.

It will be recognized that whenever a set of wheels is spaced longitudinally on the rear end of a trailer or semi-trailer, in turning corners there is a certain amount of skidding of the wheels since there is no single point of turn. For this reason, with the present assembly in some cases it may be desirable to provide a supplemental wheel assembly in which the wheels will be dirigible. In Figure 7 such an assembly has been shown. A spring and fifth wheel combination similar to that described with respect to Figures 1 to 3 is provided on an axle 100 which has a forward stabilizer tongue 101; on the ends of the axles king pins 102 are pivoted at 104.

These king pins 102 are positioned to co-operate with double wheel assemblies 110 wherein it will be seen that the inner wheel has an outwardly dished flange 112 fastening to the flange 114 of the outer wheel and shaped to permit the king pin to be positioned as close as possible to the center of the wheel assembly. The king pin 102 is controlled by bell crank arms 116 which extend rearwardly of the assembly and are connected by an alignment tie bar 117, composed of threaded studs 118, a pivot double stud 119 and threaded sleeves 120.

A stabilizing unit extends between arms 116 consisting of cylinder tubes 130 pivoted to arms 116 and a double piston rod 132 pivoted at 133 to a link 134 which is also pivoted to axle 100 at 134a and to double stud 119 at 134b. A small hydraulic line 135 connects the ends of cylinders 130 and a liquid supply tank or reservoir 136 furnishes fluid to this line through a check valve (not shown). A shutoff valve 137 in line 135 is provided. With valve 137 open, the wheels 110 will caster together when the vehicle is turning and the hydraulic connection through the restricted tube 135 will stabilize the action to prevent shimmy.

In backing a vehicle, it is important to avoid this turning action. By closing valve 137, cylinders 130 cooperating with the pivoted double piston rod 133 will lock the wheels by preventing liquid from passing between the two cylinders.

In Figure 9, a somewhat simpler construction has been shown in which a fifth wheel 150 is connected to a wheel combination including a cross member 152 and a parallel cross member 154 which form a parallelogram assembly with yokes 156 and 158 at each end on which are mounted the stub axles 160. An anchor draw bar 164 is connected directly and through side yokes 166 to the bar 152. The rear bar 154 is approximately in line with stub axles 160 and will shift relative to axle bar 152 to give a caster action to the wheels mounted on the axles.

What I claim is:

1. In a trailer or truck unit having at least one permanent wheel support, a detachable supplemental wheel support comprising, a wheel and axle combination, fifth wheel means to detachably secure said combination to the trailer or truck in a position forwardly of the permanent wheel support and independently thereof, a tongue member on said axle for connecting to the truck unit forwardly of the fifth wheel means to stabilize said supplemental support unit, coil spring means interposed between said combination and said fifth wheel means, threaded elevating means interconnecting said combination and said spring means facilitating adjustment of the stress in said spring means, whereby to equalize the load carried by said supplemental support and the permanent support on the truck unit and support means independent of said threaded elevating means for supporting the load of said spring means.

2. In a trailer or truck unit having at least one permanent wheel support, a detachable supplemental wheel support comprising, a wheel and axle combination, fifth wheel means to detachably secure said combination to the trailer or truck in a position forwardly of the permanent wheel support and independently thereof, a tongue member on said axle for connecting to the truck unit forwardly of the fifth wheel means to stabilize said supplemental support unit, coil spring means interposed between said combination and said fifth wheel means, threaded elevating means interconnecting said combination and said spring means facilitating adjustment of the stress in said spring means, whereby to equalize the load carried by said supplemental support and the permanent support on the truck unit and U-shaped members to pass around said elevating means between said coil spring means and axle to support the load of the spring means.

References Cited in the file of this patent

UNITED STATES PATENTS

| | | |
|---|---|---|
| 396,671 | Sproul | Jan. 22, 1889 |
| 1,934,670 | Hickman | Nov. 7, 1933 |
| 2,135,291 | Pinard | Nov. 1, 1938 |
| 2,373,398 | Hoobler | Apr. 10, 1945 |
| 2,397,296 | Scribner | Mar. 26, 1946 |
| 2,413,212 | Brown | Dec. 24, 1946 |
| 2,431,331 | Johnson | Nov. 25, 1947 |
| 2,523,375 | Jones et al. | Sept. 26, 1950 |
| 2,525,506 | Wiedman | Oct. 10, 1950 |
| 2,534,575 | Conley et al. | Dec. 19, 1950 |
| 2,662,781 | Hopson | Dec. 15, 1953 |

FOREIGN PATENTS

| | | |
|---|---|---|
| 116,159 | Great Britain | June 16, 1918 |